(12) United States Patent
Senda

(10) Patent No.: US 6,252,990 B1
(45) Date of Patent: Jun. 26, 2001

(54) MULTICHANNEL MULTIPLEX SYSTEM FOR TRANSMITTING AND RECEIVING CODED DATA SIGNALS

(75) Inventor: Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/087,228

(22) Filed: May 29, 1998

(30) Foreign Application Priority Data

May 31, 1997  (JP) .................................................. 9-157457

(51) Int. Cl.$^7$ ...................................................... G06K 9/36
(52) U.S. Cl. ............................................. 382/232; 725/151
(58) Field of Search .................................... 382/232, 234, 382/236; 348/387, 399, 401, 402, 409, 413, 414, 415, 416, 423, 430, 431; 341/106, 102, 107

(56) References Cited

U.S. PATENT DOCUMENTS

| | | | |
|---|---|---|---|
| 5,583,562 | * 12/1996 | Birch et al. | 725/151 |
| 5,767,913 | * 6/1998 | Kassatly | 375/240.18 |
| 5,835,487 | * 11/1998 | Campanella | 370/316 |
| 5,861,919 | * 1/1999 | Perkins et al. | 348/385.1 |
| 5,956,088 | * 9/1999 | Shen et al. | 375/240.25 |

FOREIGN PATENT DOCUMENTS 10-70589   3/1998   (JP) .

OTHER PUBLICATIONS

Japanese Office Action issued Jan. 30, 2001 in a related application with English translation of revelant portions.

* cited by examiner

Primary Examiner—Joseph Mancuso
Assistant Examiner—Ali Bayat
(74) Attorney, Agent, or Firm—Ostrolenk, Faber, Gerb & Soffen, LLP

(57) ABSTRACT

A multiplex data transmission system for transmitting N coded programs having differing bandwidth requirements over M separate channels. The N programs are separately encoded and allocated to the M channels in such a manner that optimum use is made of the available bandwidth in the channels. This is achieved by summing the bandwidth requirements for all the possible distinct combinations of the N programs taken M at a time, and selecting the combination which most closely matches the bandwidth capabilities of the available channels. A multiplexing device generates M separate coded data strings corresponding to the program allocation. At the receiver, a decoder is provided which selectively recovers a user-designated one of the N programs. The decoder includes an input device by which the user designates the desired program, a selecting device which selects the multiplexed code string including the designated program based on identifying information transmitted with the coded data strings, an inverse multiplexing device which extracts the designated coded program signal from the selected one of the M multiplexed code strings and a decoding circuit which decodes the encoded data signal extracted by the inverse multiplexing device to recreate the desired program.

25 Claims, 13 Drawing Sheets

FIG. 1 PRIOR ART
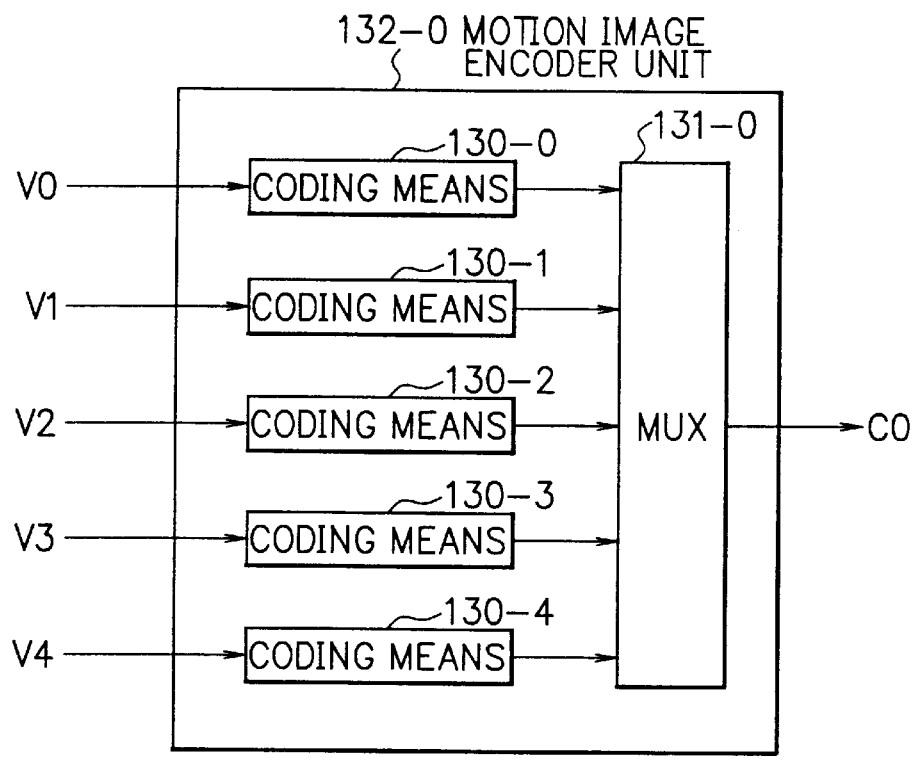
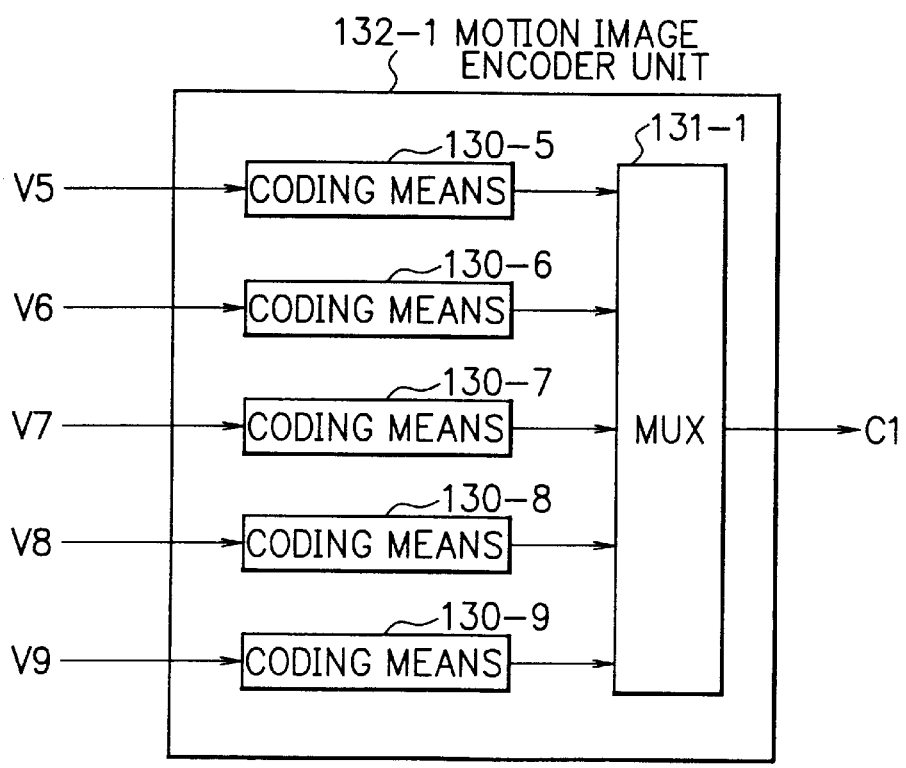

F I G. 3
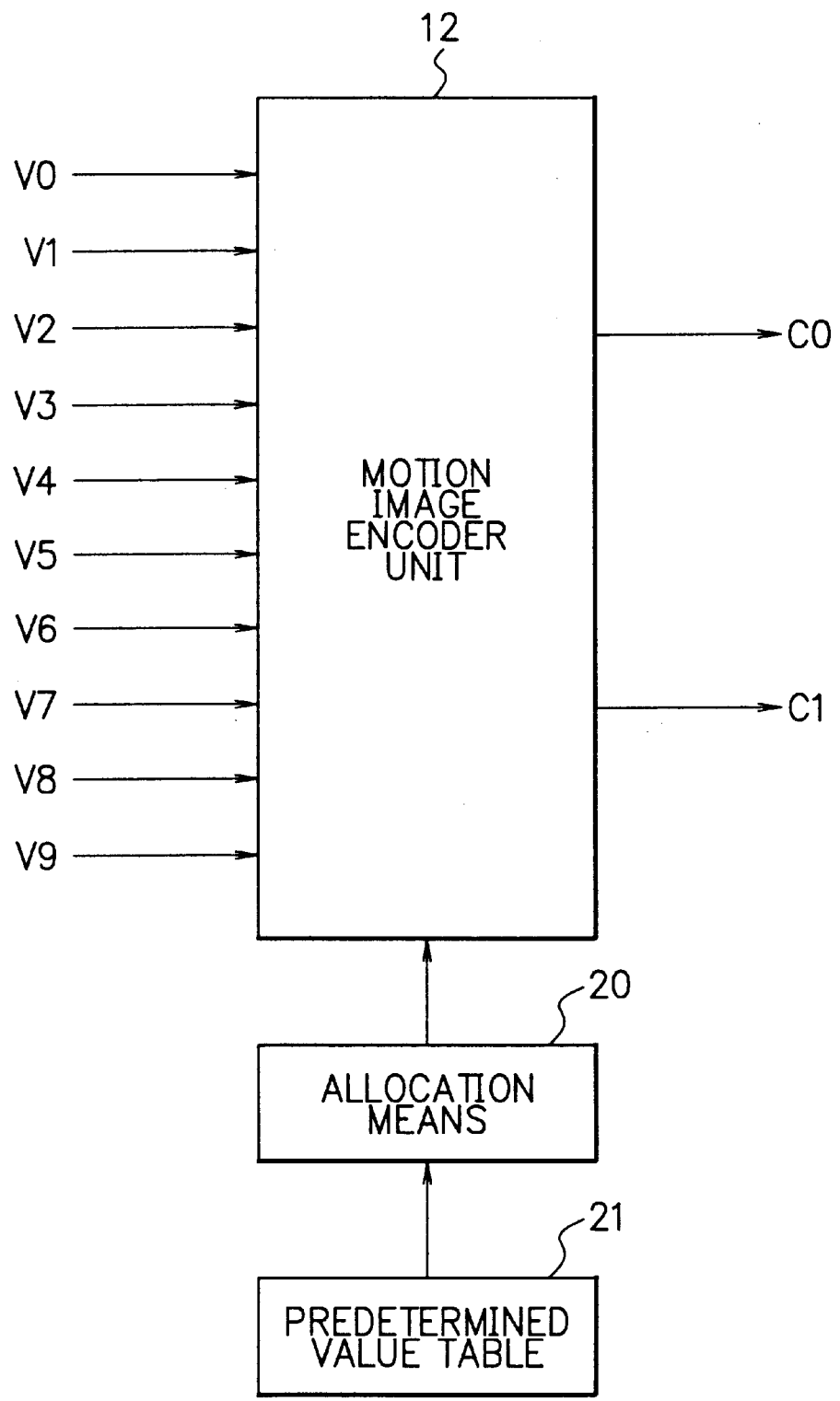

FIG. 4

| TIME | PREDETERMINED VALUES OF NECESSARY BIT RATES |
|---|---|
| T1 | A= {3,3,4,4,4,6,6,10,10,10} |
| T2 | A= {6,6,6,6,4,4,10,6,6,6} |
| T3 | ------------ |
| ⋮ | ⋮ |

FIG. 7

| TIME | PREDETERMINED VALUES AND VARIATION RATES OF NECESSARY BIT RATES |
|---|---|
| T1 | A= {3,3,4,4,4,6,6,10,10,10}<br>B= {1,1,1,1,2,1,3,2,5,3} |
| T2 | A= {6,6,6,6,4,4,10,6,6,6}<br>B= {1,1,1,1,2,2,5,3,2,3,} |
| T3 | ---------- |

MULTICHANNEL MULTIPLEX SYSTEM FOR TRANSMITTING AND RECEIVING CODED DATA SIGNALS

BACKGROUND OF THE INVENTION

The present invention relates to a motion image encoder which inputs a plurality of motion image signals, codes the input motion image signals, multiplexes the coded motion image signals, and sends out the multiplexed motion image signals to a plurality of transponders, a motion image decoder which decodes multiplexed motion image signals transmitted via a plurality of transponders, and a readable storage medium storing an encoding or decoding program.

DESCRIPTION OF THE RELATED ART

Now, digital satellite broadcasting is put into practice pursuant to the IS-13818 (MPEG-2) standard of the international standard organization (ISO). An artificial satellite is provided with a plurality of transponders (transmission lines). A transmission ability per one transponder (bit rate) is approximately 30 Mbps. For example, assuming that 6 Mbps as the necessary bit rate required in coding motion image signals to meet image quality is required, 5 motion image signals can be transmitted per one transponder (multiplicity 5), and thus 20 transponders are required for broadcasting 100 motion image signals (100 channels of motion image signals) in digital satellite broadcasting.

Each channel is composed of a variety of programs, and the necessary bit rate changes depending on the contents of the programs. For instance, in a hard motion sports relay broadcast, a bit rate of approximately 10 Mbps is required. If a coding is carried out at approximately 6 Mbps in a similar manner to a usual motion sports relay broadcast, the image quality is degraded. In order to prevent such a problem, it is considered that the multiplicity of the transponders is reduced and the bit rate allocated to each motion image signal is increased. In such a case, when the number of the motion image signals is equal, the number of the transponders must be increased. Alternatively, when the number of the transponders is equal, the number of the motion image signals must be reduced.

In order to solve this problem, a statistical multiple coding has been developed, in which a bit rate allocated to each motion image signal is not fixed, but the sum of the bit rates is fixed.

In FIG. 1, there is shown a conventional motion image encoder using the statistical multiple coding. As shown in FIG. 1, the motion image encoder comprises two image motion encoder units 132-0 and 132-1, in which 10 motion image signals V0 to V9 are coded and then multiplexed (5 signals in each image motion encoder unit 132-0 or 132-1) to output two multiplexed motion image signals to transponders (not shown) C0 and C1 from the image motion encoder units 132-0 and 132-1, respectively.

More specifically, the motion image encoder unit 132-0 includes 5 coding means 130-0, 130-1, 130-2, 130-3 and 130-4 for coding the motion image signals V0, V1, V2, V3 and V4 to output code strings, and a multiplexer (MUX) 131-0 for multiplexing the code strings output from the coding means 130-0, 130-1, 130-2, 130-3 and 130-4 to send out a multiplexed code string to a transponder C0. Similarly, the motion image encoder unit 132-1 includes 5 coding means 130-5, 130-6, 130-7, 130-8 and 130-9 for coding the motion image signals V5, V6, V7, V8 and V9 to output code strings, and a multiplexer (MUX) 131-1 for multiplexing the code strings output from the coding means 130-5, 130-6, 130-7, 130-8 and 130-9 to send out a multiplexed code string to a transponder C1.

Now, for example, it is assumed that the transmission ability of the transponders C0 and C1 are each 30 Mbps, and that the necessary bit rates of the motion image signals V0 and V5 are each 10 Mbps and those of the motion image signals V1 to V4 and V6 to V9 are each 5 Mbps in a certain time period. The sum of the bit rates allocated to the 5 signals V0 to V4 or V5 to V9 becomes 30 Mbps which is equal to the transmission ability of the transponder C0 or C1, inviting no image quality degradation. In this manner, in the conventional motion image encoder shown in FIG. 1, even when a large bit rate is required for parts of the motion image signals V0 to V9, the sum of the bit rates for the motion image signals V0 to V4 is equal to or less than the transmission ability of the transponder C0 and the sum of the bit rates for the motion image signals V5 to V9 is equal to or less than the transmission ability of the transponder C1, resulting in preventing the image quality degradation.

However, in this conventional motion image encoder, as described above, the motion image signals V0 to V4 are coded in the respective coding means and are then multiplexed in the MUX to output the multiplexed code string to the transponder C0, and similarly, the motion image signals V5 to V9 are coded in the respective coding means and are then multiplexed in the MUX to output the multiplexed code string to the transponder C1. That is, the groups of motion image signals correspond fixedly to the respective transponders. As a result, the transmission ability of a plurality of transponders cannot be sufficiently exploited, and the image quality may be deteriorated.

For instance, it is assumed that the transmission ability of the transponders C0 and C1 are each 30 Mbps, and that the necessary bit rates of the motion image signals V0 and V1 are each 3 Mbps, those of the motion image signals V2 to V4 are each 4 Mbps, those of the motion image signals V5 and V6 are each 6 Mbps, and V7 to V9 are each 10 Mbps in a certain time period. In the conventional motion image encoder, the motion image signals V0 to V4 and V5 to V9 are fixedly assigned to the respective transponders C0 and C1, respectively, and the sum of the necessary bit rates for the motion image signals is 18 Mbps or 42 Mbps in the transponder C0 or C1, respectively. The transmission ability of the transponders C0 and C1 is each 30 Mbps. In other words, the transponder C0 has 12 Mbps surplus while the transponder C1 is 12 Mbps short with the result of the image quality degradation.

SUMMARY OF THE INVENTION

It is therefore an object of the present invention to provide a motion image encoder in view of the aforementioned problems of the prior art, which is capable of making an effective use of a plurality of transponders without surplus and shortage in their transmission ability, and preventing image quality degradation.

It is another object of the present invention to provide a motion image decoder for decoding motion image signals coded by the above motion image encoder, which is capable of preventing image quality degradation.

It is a further object of the present invention to provide a readable storage medium storing a program for realizing a motion image encoder and decoder using a computer, the program operating the computer as parts of the motion image encoder and decoder, which is capable of preventing image quality degradation.

In accordance with one aspect of the present invention, there is provided a motion image encoder, in which N-number of motion image signals are coded to produce N-number of code strings and the N-number of code strings are multiplexed to produce M-number of multiplexed code strings to be output to M-number of respective transponders, comprising N-number of coding means for coding N-number of respective motion image signals to produce N-number of code strings; and multiplexing means for multiplexing the N-number of code strings per M-number of groups corresponding to M-number of transponders to produce M-number of multiplexed code strings, while grouping the N-number of code strings into M-number so that the sum of the necessary bit rates of each group of the motion image signals included in each of the M-number of multiplexed code strings becomes closest to bit rates of the corresponding transponder, and outputting the M-number of multiplexed code strings to the respective transponders.

In this construction, the N-number of coding means code the input motion image signals to produce the code strings. The multiplexing means then multiplexes the N-number of code strings per M-number of groups corresponding to M-number of transponders to produce M-number of multiplexed code strings, while grouping the N-number of code strings into M-number so that the sum of the necessary bit rates of each group of the motion image signals included in each of the M-number of multiplexed code strings becomes closest to bit rates of the corresponding transponder, and outputs the M-number of multiplexed code strings to the respective transponders. That is, in the above construction, the relationship between the motion image signals and the transponders is not fixed, and the motion image signals are properly allocated to the transponders so that the sum of the necessary bit rates of the motion image signals allocated to each transponder may be closest to the bit rates of the corresponding transponder.

For example, now, it is considered that 10 motion image signals V0 to V9 are coded and then multiplexed to output the multiplexed code strings to the transponders C0 and C1. It is assumed that the transmission ability of both the transponders C0 and C1 is 30 Mbps in common, and the bit rate of the motion image signals V0 and V1 is 3 Mbps, that of the motion image signals V2 to V4 is 4 Mbps, that of the motion image signals V5 and V6 is 6 Mbps, and that of the motion image signals V7 to V9 is 10 Mbps in a certain time period.

In this motion image encoder, the corresponding relationship between the V0 to V9 and the transponders C0 and C1 is changed so that the sums of the necessary bit rates of the transponders may be closest to the transmission ability of the transponders. Thus, the motion image signals V0 to V6 are allocated to the transponder C0 and the motion image signals V7 to V9 are allocated to the transponder C1. As a result, the sums of the necessary bit rates of the transponders C0 and C1 becomes 30 Mbps in common, and the image quality degradation can be presented. Alternatively, the motion image signals V0 to V2, V8 and V9 are allocated to the transponder C0 and the motion image signals V3 to V7 are allocated to the transponder C1. In this case, the sums of the necessary bit rates of the transponders C0 and C1 become 30 Mbps in common, and thus the image quality degradation can be avoided as well.

In order to achieve the above object of the present invention with a simple construction, the motion image encoder can further comprises a predetermined value table for storing predetermined values of the necessary bit rates of the N-number of motion image signals in each time period; and allocation means for determining corresponding relationship between the transponders and the N-number of motion image signals allocated thereto in each time period so as to permit the sum of the necessary bit rates of the motion image signals included in each of the M-number of multiplexed code strings to be closest to the bit rates of the corresponding transponder on the basis of contents of the predetermined value table, and the multiplexing means multiplexes the N-number of code strings per the M-number of groups corresponding to the M-number of transponders to produce the M-number of multiplexed code strings according to the corresponding relationship determined by the allocation means, and outputs the M-number of multiplexed code strings to the respective transponders.

In this construction, the allocation means determines the corresponding relationship between the transponders and the N-number of motion image signals allocated thereto in each time period so as to permit the sum of the necessary bit rates of the motion image signals included in each of the M-number of multiplexed code strings to be closest to the bit rates of the corresponding transponder on the basis of contents of the predetermined value table, and the multiplexing means multiplexes the N-number of code strings per the M-number of groups corresponding to the M-number of transponders to produce the M-number of multiplexed code strings according to the corresponding relationship determined by the allocation means, and outputs the produced M-number of multiplexed code strings to the respective transponders.

Further, in order to achieve the above object of the present invention with a simple construction and to reduce the danger of the image quality degradation effectively, the motion image encoder further comprises a predetermined value table for storing predetermined values and variation rates of the necessary bit rates of the N-number of motion image signals in each time period; and allocation means for determining corresponding relationship between the transponders and the N-number of motion image signals allocated thereto in each time period so as to permit the statistical sum of the necessary bit rates of the motion image signals included in each of the M-number of multiplexed code strings to be closest to the bit rates of the corresponding transponder on the basis of contents of the predetermined value table, and the multiplexing means multiplexes the N-number of code strings per the M-number of groups corresponding to the M-number of transponders to produce the M-number of multiplexed code strings according to the corresponding relationship determined by the allocation means, and outputs the M-number of multiplexed code strings to the respective transponders.

In this construction, the allocation means determines the corresponding relationship between the transponders and the N-number of motion image signals allocated thereto in each time period so as to permit the statistical sum of the necessary bit rates of the motion image signals included in each of the M-number of multiplexed code strings to be closest to the bit rates of the corresponding transponder on the basis of contents of the predetermined value table, and the multiplexing means multiplexes the N-number of code strings per the M-number of groups corresponding to the M-number of transponders to produce the M-number of multiplexed code strings, and outputs the produced M-number of multiplexed code strings to the respective transponders.

In accordance with another aspect of the present invention, there is provided a motion image encoder, in which N-number of motion image signals are coded to produce N-number of code strings and the N-number of code strings are multiplexed to produce M-number of multiplexed code strings to be output to M-number of respective transponders, comprising M-number of multiplexing means corresponding to M-number of transponders, for multiplexing input code strings to produce M-number of multiplexed code strings to output the produced multiplexed code strings to the corresponding transponders;

> M-number of coding units, each including a plurality of coding means, corresponding to the M-number of multiplexing means, for coding input motion image signals to produce code strings to output the produced code strings to the corresponding multiplexing means; and
>
> switch means for allocating the N-number of motion image signals to the M-number of coding units so as to permit the sum of the necessary bit rates of the motion image signals allocated to each coding unit to be closest to bit rates of the corresponding transponder.

In this construction, the switch means allocates the input N-number of motion image signals to the M-number of coding units corresponding to the respective transponders. At this time, the switch means allocates the motion image signals so that the sum of the necessary bit rates of the motion image signals allocated to each coding unit may be closest to the bit rates of the corresponding transponder. Each coding unit codes the motion image signals allocated by the switch means to produce the code string, and each multiplexing means multiplexes the input code strings to produce the multiplexed code string and outputs the produced multiplexed code string to the corresponding transponder.

Moreover, in order to achieve the above object of the present invention with a simple construction, the motion image encoder can further comprises a predetermined value table for storing predetermined values of the necessary bit rates of the N-number of motion image signals in each time period; and > allocation means for determining corresponding relationship between the coding units and the N-number of motion image signals allocated thereto in each time period so as to permit the sum of the necessary bit rates of the motion image signals included in each of the M-number of multiplexed code strings to be closest to the bit rates of the corresponding transponder on the basis of contents of the predetermined value table, and the switch means allocates the N-number of motion image signals to the M-number of coding units according to the corresponding relationship determined by the allocation means.

In this construction, the allocation means determines the corresponding relationship between the coding units and the N-number of motion image signals allocated thereto in each time period so as to permit the sum of the necessary bit rates of the motion image signals included in each of the M-number of multiplexed code strings to be closest to the bit rates of the corresponding transponder on the basis of contents of the predetermined value table, and the switch means allocates the N-number of motion image signals to the M-number of coding units according to the corresponding relationship determined by the allocation means.

Further, in order to achieve the above object of the present invention with a simple construction and to reduce the danger of the image quality degradation effectively, the motion image encoder can further comprises a predetermined value table for storing predetermined values and variation rates of the necessary bit rates of the N-number of motion image signals in each time period; and > allocation means for determining corresponding relationship between the coding units and the N-number of motion image signals allocated thereto in each time period so as to permit the statistical sum of the necessary bit rates of the motion image signals included in each of the M-number of multiplexed code strings to be closest to the bit rates of the corresponding transponder on the basis of contents of the predetermined value table, and the switch means allocates the N-number of motion image signals to the M-number of coding units according to the corresponding relationship determined by the allocation means.

In this construction, the allocation means determines the corresponding relationship between the coding units and the N-number of motion image signals allocated thereto in each time period so as to permit the statistical sum of the necessary bit rates of the motion image signals included in each of the M-number of multiplexed code strings to be closest to the bit rates of the corresponding transponder on the basis of contents of the predetermined value table, and the switch means allocates the N-number of motion image signals to the M-number of coding units according to the corresponding relationship determined by the allocation means.

In order to decode the multiplexed code strings coded by the motion image encoder of the present invention to obtain the motion image signals, the motion image decoder for decoding multiplexed code strings input to output one motion image signal, comprises selecting means for selecting one multiplexed code string including a code string corresponding to a motion image signal designated by a user from M-number of multiplexed code strings transmitted from a transmitter side on the basis of corresponding information showing that what kinds of motion image signals are included in the M-number of multiplexed code strings;

> inverse multiplexing means for picking out one code string corresponding to the motion image signal designated by the user from the multiplexed code string selected by the selecting means on the basis of the corresponding information; and
>
> decoding means for decoding the code string output from the inverse multiplexing means to obtain a motion image signal.

In this construction, the selecting means selects one multiplexed code string including a code string corresponding to a motion image signal designated by a user from M-number of multiplexed code strings, and the inverse multiplexing means picks out one code string corresponding to the motion image signal designated by the user from the multiplexed code string selected by the selecting means. The decoding means decodes the code string output from the inverse multiplexing means to obtain a motion image signal.

Moreover, in order to decode the multiplexed code strings coded by the motion image encoder of the present invention to obtain the motion image signals, the motion image decoder for decoding multiplexed code strings input to output one motion image signal, comprises M-number of inverse multiplexing means for picking out one code string to be output from M-number of multiplexed code strings input to output the picked code string;

> instructing means for instructing the inverse multiplexing means inputting the multiplexed code string including the code string corresponding to the motion image signal designated by a user to output the code string designated by the user on the basis of corresponding information showing that what kinds of motion image signals are included in the M-number of multiplexed code strings;

synthesizing means for synthesizing the code strings output from the M-number of inverse multiplexing means to output a synthesized code string; and decoding means for decoding the synthesized code string output from the synthesizing means to output a motion image signal.

In this construction, the instructing means instructs the inverse multiplexing means inputting the multiplexed code string including the code string corresponding to the motion image signal designated by a user to output the code string designated by the user, and one inverse multiplexing means instructed by the instructing means among the M-number of inverse multiplexing means outputs the code string designated by the user. The synthesizing means synthesizes the code strings output from the inverse multiplexing means, and the decoding means decodes the synthesized code string output from the synthesizing means to obtain a motion image signal.

In order to achieve the above object of the present invention, a readable storage medium stores a program for realizing a motion image encoder using a computer, in which N-number of motion image signals are coded to produce N-number of code strings and the N-number of code strings are multiplexed to produce M-number of multiplexed code strings to be output to M-number of respective transponders, the program functioning the computer as N-number of coding means for coding N-number of respective motion image signals to produce N-number of code strings; and multiplexing means for multiplexing the N-number of code strings per M-number of groups corresponding to M-number of transponders to produce M-number of multiplexed code strings, while grouping the N-number of code strings into M-number so that the sum of the necessary bit rates of each group of the motion image signals included in each of the M-number of multiplexed code strings becomes closest to bit rates of the corresponding transponder, and outputting the M-number of multiplexed code strings to the respective transponders.

Moreover, in order to achieve the above object of the present invention, a readable storage medium stores a program for realizing a motion image decoder for decoding multiplexed code strings input to output one motion image signal using a computer, the program functioning the computer as selecting means for selecting one multiplexed code string including a code string corresponding to a motion image signal designated by a user from M-number of multiplexed code strings transmitted from a transmitter side on the basis of corresponding information showing that what kinds of motion image signals are included in the M-number of multiplexed code strings;

inverse multiplexing means for picking out one code string corresponding to the motion image signal designated by the user from the multiplexed code string selected by the selecting means on the basis of the corresponding information; and decoding means for decoding the code string output from the inverse multiplexing means to obtain a motion image signal.

BRIEF DESCRIPTION OF THE DRAWINGS

The objects, features and advantages of the present invention will become more apparent from the consideration of the following detailed description, taken in conjunction with the accompanying drawings, in which:

FIG. 1 is a block diagram of a conventional motion image encoder;

FIG. 3 is a block diagram of a motion image encoder according to a second embodiment of the present invention;

FIG. 4 is a schematic diagram showing contents of a predetermined value table storing the predetermined values of necessary bit rates, shown in FIG. 3;

FIG. 7 is a schematic diagram showing contents of a predetermined value table storing the predetermined values and variation rates of necessary bit rates, shown in FIG. 6;

DESCRIPTION OF THE PREFERRED EMBODIMENTS

Figure 2:
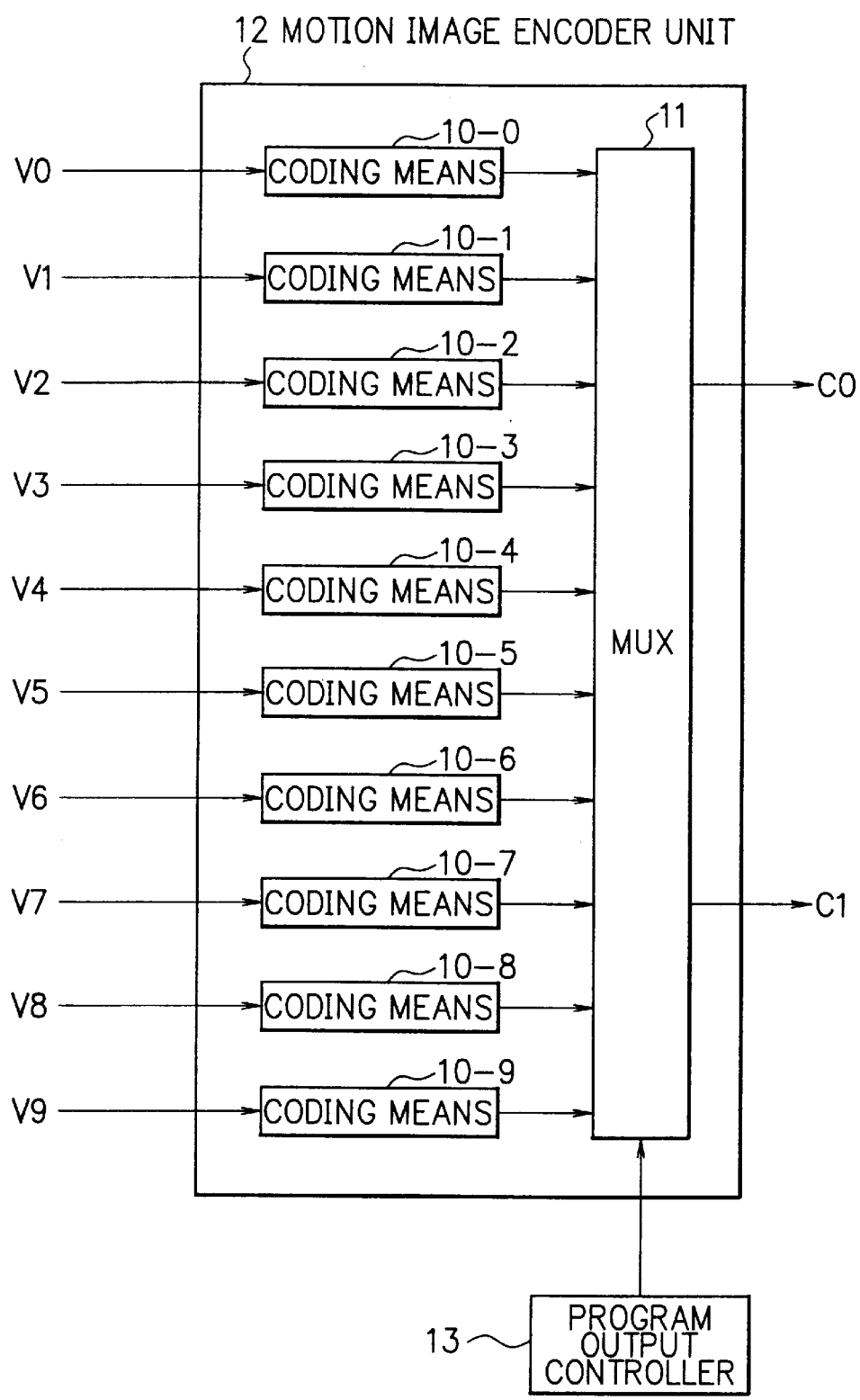
FIG. 2 is a block diagram of a motion image encoder according to a first embodiment of the present invention.

Referring now to the drawings, there is shown in FIG. 2 a motion image encoder according to a first embodiment of the present invention.

In FIG. 2, the motion image encoder, which codes 10 motion image signals V0 to V9 and multiplexes 10 code strings to output two multiplexed code strings to transponders (not shown) C0 and C1 as hereinafter described in detail, comprises a motion image encoder unit 12 and a program output controller 13.

The motion image encoder unit 12 includes 10 coding means 10-0, 10-1, 10-2, 10-3, 10-4, 10-5, 10-6, 10-7, 10-8 and 10-9, and a multiplexer (MUX) 11.

The program output controller 13 outputs a control signal representing the corresponding relationship between the motion image signals V0 to V9 and the transponders C0 and C1 so as to allocate the necessary bit rates of the motion image signals V0 to V9 to the transponders C0 and C1 equally. This corresponding relationship represented by the control signal show which of the transponders C0 and C1 and which places of the transponder C0 or C1 the motion image signals are multiplexed to. Moreover, the corresponding relationship is changed with the elapse of time depending on the contents of the motion image signals V0 to V9.

The 10 coding means 10-0, 10-1, 10-2, 10-3, 10-4, 10-5, 10-6, 10-7, 10-8 and 10-9 code the respective 10 input motion image signals V0 to V9 to output 10 motion code strings to the multiplexer 11. The multiplexer 11 multiplexes the 10 motion image code strings to output two multiplexed code strings to the transponders C0 and C1 according to the control signal sent from the program output controller 13. The multiplexer 11 also multiplexes the corresponding relationship represented by the control signal.

Now, when the corresponding relationship represented by the control signal shows that the motion image signals V0 to V6 are to be multiplexed to the first to seventh orders of the transponder C0 and the motion image signals V7 to V9 are to be multiplexed to the first to third orders of the transponder C1, the multiplexer 11 multiplexes the code strings sent from the coding means 10-0 to 10-6 to the first to seventh orders along with multiplexing the corresponding relationship represented by the control signal to output a multiplexed code string to the transponder C0, and multiplexes the code strings fed from the coding means 10-7 to 10-9 to the first to third orders along with multiplexing the corresponding relationship to output another multiplexed code string to the transponder C1.

FIG. 3 shows a motion image encoder according to a second embodiment of the present invention. In this embodiment, the motion image encoder comprises a motion image encoder unit 12, an allocation means 20 and a predetermined value table 21 of the necessary bit rates. The motion image encoder unit 12 has the same construction and functions as those of that of the first embodiment shown in FIG. 2.

The predetermined value table 21 stores the predetermined values of the necessary bit rates of the 10 motion image signals V0 to V9 in each time period. The predetermined value table 21 is constructed on a memory and its contents can be freely changed from the outside.

FIG. 4 illustrates the contents of the predetermined value table 21. It is readily understood from FIG. 4, that the predetermined values A of the necessary bit rates of the motion image signals V0 to V9 in a time period T1≦T<T2 (T: present time) are 3, 3, 4, 4, 4, 6, 6, 10, 10 and 10 (Mbps), respectively, and those in another time period T2≦T<T3 are 6, 6, 6, 6, 4, 4, 10, 6, 6 and 6 (Mbps), respectively.

The allocation means 20 calculates the sum of the necessary bit rates of each transponder C0 or C1 with respect to the effective combination according to the corresponding relationship between the two transponders C0 and C1 and the 10 motion image signals V0 to V9 allocated thereto on the basis of the contents of the predetermined value table 21, adopts a combination of the motion image signals so as to minimize the maximum value of the sum of the necessary bit rates to determine the corresponding relationship in each time period, and outputs the determined corresponding relationship to the motion image encoder unit 12.

Next, an operation of the motion image encoder described above will be described in connection with FIG. 5 which shows a processing of the allocation means 20.

Figure 5:
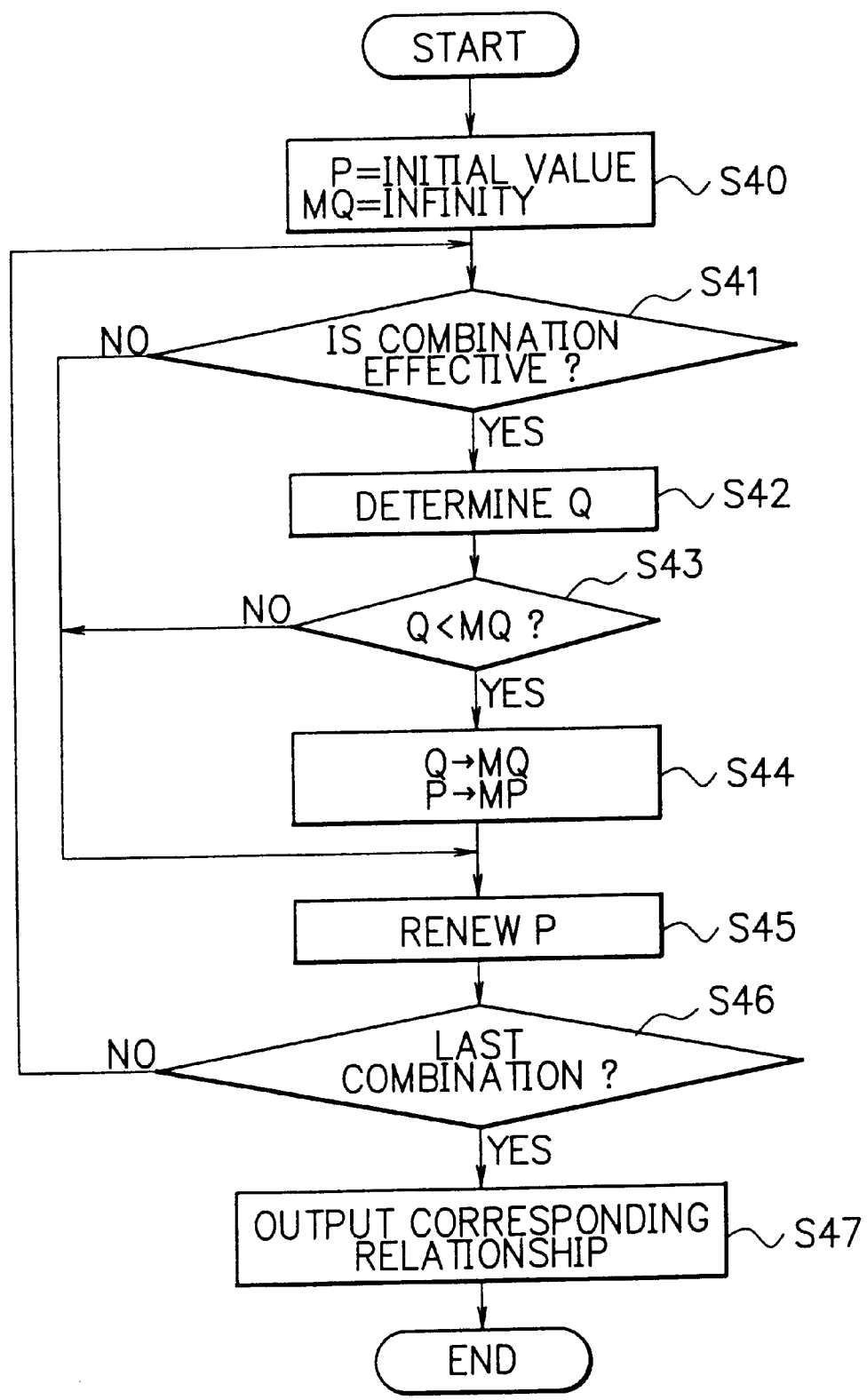
FIG. 5 is a flow chart showing an operation of an allocation means, shown in FIG. 3.

When the present time T becomes a set time (T1, T2, T3, . . . ) stored in the predetermined value table 21, the allocation means 20 starts the processing shown in FIG. 5.

An initial value of a combination is set to a variable P, and infinity is set to a variable MQ in step S40. The variable P is composed of 10 elements P0 to P9 (available value is "0" or "1"). An i-th element Pi (i=0 to 9) represents whether an i-th motion image signal Vi is allocated to the transponder C0 or C1. That is, when the variable Pi is "0", the motion image signal Vi is allocated to the transponder C1. The variable MQ holds the minimum value among evaluation values obtained during the processing, and a variable MP holds the value of the variable P at this time (see step S44).

The allocation means 20 inspects whether the combination shown by the variable P is an effective or ineffective combination in step S41. When it is an effective combination, move to step S42, or when it is an ineffective combination, move to step S45. An ineffective combination, for example, means a combination of which all the motion image signals V0 to V9 are allocated to only one transponder, or the like.

The sum of the necessary bit rates for each transponder C0 or C1 in the combination shown by the variable P is calculated, and their maximum value is determined as an evaluation value Q of its combination in step S42. The sum Tc of the necessary bit rates of a c-th transponder (c="0" or "1") is obtained as follows.

$$Tc = \sum_{i=0}^{9} \delta_{Pi,c} Ai \qquad (1)$$

In formula (1), δx,y is a function which is "1" when x=y, otherwise "0", and Ai is a predetermined value A of the necessary bit rate of the motion image signal Vi and is obtained from the predetermined value table 21 of the necessary bit rates. For instance, when the present time T is T1≦T<T2, the predetermined values A={3, 3, 4, 4, 4, 6, 6, 10, 10, 10} are read out. Thereafter, an evaluation value Q is obtained as follows.

$$Q = \max_{C=0,1} Tc \qquad (2)$$

The evaluation value Q is compared with the variable MQ in step S43. When Q<MQ, move to step S44, otherwise move to step S45. Substitute the evaluation value Q for the variable MQ and substitute the variable P for the variable MP in step S44. The variable P is changed to show the next combination in step S45. At this time, when the variable P shows the last combination, it is renewed to a code showing the completion. The variable P is inspected in step S46. When it does not show the completion, return to step S41. When it shows the completion, move to step S47. The variable MP is adopted as the last combination and outputs as the corresponding relationship between the motion image signals and the transponder in step S47. The operation is ended.

Now, for example, it is assumed that the contents of the predetermined value table 21 are shown in FIG. 4, and the allocation means 20 starts the processing shown in FIG. 5 at a time T1.

First, the allocation means 20 initialize a variable P as follows and sets infinity to a variable MQ in step S40 in FIG. 5.

P={0, 0, 0, 0, 0, 0, 0, 0, 0, 0,}

Thereafter, evaluation values Q are calculated in regard to effective combinations of the variable P as follows.

P={1, 0, 0, 0, 0, 0, 0, 0, 0, 0}, Q=57
P={0, 1, 0, 0, 0, 0, 0, 0, 0, 0}, Q=57
P={1, 1, 0, 0, 0, 0, 0, 0, 0, 0}, Q=54
P={0, 0, 1, 0, 0, 0, 0, 0, 0, 0}, Q=56
P={1, 0, 1, 0, 0, 0, 0, 0, 0, 0}, Q=53
P={0, 1, 1, 0, 0, 0, 0, 0, 0, 0}, Q=53
P={1, 1, 1, 0, 0, 0, 0, 0, 0, 0}, Q=50
:
P={1, 1, 1, 1, 1, 1, 1, 0, 0, 0}, Q=30
:
P={1, 1, 1, 0, 1, 1, 1, 1, 1, 1}, Q=56
P={0, 0, 0, 1, 1, 1, 1, 1, 1, 1}, Q=50
P={1, 0, 0, 1, 1, 1, 1, 1, 1, 1}, Q=53
P={0, 1, 0, 1, 1, 1, 1, 1, 1, 1}, Q=53
P={1, 1, 0, 1, 1, 1, 1, 1, 1, 1}, Q=56
P={0, 0, 1, 1, 1, 1, 1, 1, 1, 1}, Q=54

P={1, 0, 1, 1, 1, 1, 1, 1, 1, 1}, Q=57
P={0, 1, 1, 1, 1, 1, 1, 1, 1, 1}, Q=57

In this case, the predetermined values A of the necessary bit rates to be required for calculating the evaluation values Q are read out of the predetermined value table 21, and at the time T1, the allocation means 20 obtains the predetermined values A={3, 3, 4, 4, 4, 6, 6, 10, 10, 10}.

From the calculation results of the above evaluation values Q, the allocation means 20 adopts the minimum evaluation value Q as the optimum combination as follows,

MP={1, 1, 1, 1, 1, 1, 1, 0, 0, 0}, MQ=30 and outputs the corresponding relationship to the motion image encoder unit 12. In other words, the allocation means 20 outputs the corresponding relationship instructing the motion image encoder unit 12 to multiplex the motion image signals V0 to V6 to the first to seventh orders of the transponder C1 and to multiplex the motion image signals V7 to V9 to the first to third orders of the transponder C0. The motion image encoder unit 12 thus conducts the aforementioned operation according to the corresponding relationship sent from the allocation means 20.

Figure 6:
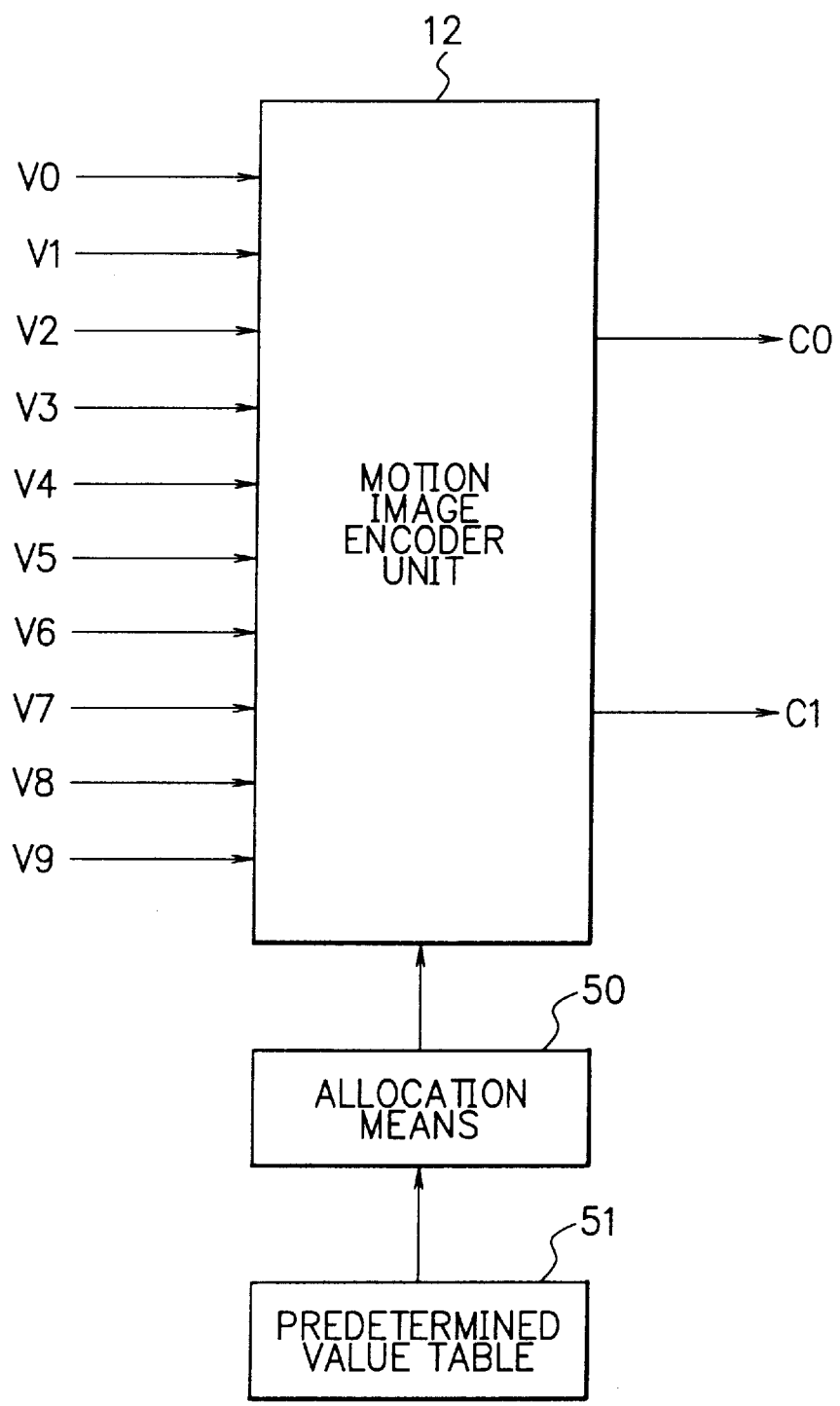
FIG. 6 is a block diagram of a motion image encoder according to a third embodiment of the present invention.

FIG. 6 shows a motion image encoder according to a third embodiment of the present invention. In this embodiment, the motion image encoder comprises a motion image encoder unit 12, an allocation means 50 and a predetermined value table 51.

The predetermined value table 51 stores the predetermined values A and variation rates B of the necessary bit rates of the 10 motion image signals V0 to V9 in a certain time period. The predetermined value table 51 is constructed on a memory and its contents can be freely changed from the outside.

FIG. 7 illustrates contents of a predetermined value table 51. In the example shown in FIG. 4, it is apparent that the predetermined values A of the necessary bit rates of the motion image signals V0 to V9 in a time period T1≦T<T2 (T: present time) are 3, 3, 4, 4, 4, 6, 6, 10, 10 and 10 (Mbps), respectively, and the variation rates B of the necessary bit rates are 1, 1, 1, 1, 2, 1, 3, 2, 5 and 3 (Mbps), respectively.

The allocation means 50 calculates the statistical sum of the necessary bit rates of each transponder C0 or C1 with respect to the effective combination according to the corresponding relationship between the two transponders C0 and C1 and the 10 motion image signals V0 to V9 allocated thereto on the basis of the contents of the predetermined value table 51, adopts a combination of the motion image signals so as to minimize the maximum value of the sum of the necessary bit rates to determine the corresponding relationship in each time period, and outputs the determined corresponding relationship to the motion image encoder unit 12.

The allocation means 50 implements the same operation as one shown in FIG. 5 by the allocation means 20 shown in FIG. 3 except the following processing in place of that in step S42 shown in FIG. 5.

That is, the statistical sum of the necessary bit rates of each transponder C0 or C1 in the combination shown by the variable P is calculated, and the maximum value of their sums is determined as an evaluation value Q of its combination. The statistical sum Tc is calculated as follows.

$$Tc = \sum_{i=0}^{9} \delta_{Pi,c}(Ai - \alpha Bi) + \alpha \left[ \sum_{i=0}^{9} \delta_{Pi}, Bi^2 \right]^{1/2} \quad (3)$$

In formula (3), Bi represents a variation rate of the necessary bit rates of the motion image signals V0 to V9 to be multiplexed and is read out of the predetermined value table 51. For instance, when the present time T is T1≦T<T2, the variation rates B={1, 1, 1, 1. 2. 1, 3, 2, 5, 3 25} are read out. Further, α is a parameter for determining quality and is determined to be "2" in this case.

Now, for example, it is assumed that the contents of the predetermined value table 51 are shown in FIG. 7, and the allocation means 50 starts the processing at a time T1.

First, the allocation means 50 initialize a variable P as follows and sets infinity to a variable MQ.

P={0, 0, 0, 0, 0, 0, 0, 0, 0, 0}

Thereafter, evaluation values Q are calculated as effective combinations of the variable P are changed in order as follows.

P={1, 0, 0, 0, 0, 0, 0, 0, 0, 0}, Q=33.8324
P={0, 1, 0, 0, 0, 0, 0, 0, 0, 0}, Q=33.8324
P={1, 1, 0, 0, 0, 0, 0, 0, 0, 0}, Q=32.6969
P={0, 0, 1, 0, 0, 0, 0, 0, 0, 0}, Q=32.8324
P={1, 0, 1, 0, 0, 0, 0, 0, 0, 0}, Q=31.6969
P={0, 1, 1, 0, 0, 0, 0, 0, 0, 0}, Q=31.6969
P={1, 1, 1, 0, 0, 0, 0, 0, 0, 0}, Q=30.5602
:
P={1, 1, 1, 0, 0, 1, 0, 1, 0, 0}, Q=19.8564
:
P={1, 1, 1, 0, 1, 1, 1, 1, 1, 1}, Q=32.8324
P={0, 0, 0, 1, 1, 1, 1, 1, 1, 1}, Q=30.5602
P={1, 0, 0, 1, 1, 1, 1, 1, 1, 1}, Q=31.6969
P={0, 1, 0, 1, 1, 1, 1, 1, 1, 1}, Q=31.6969
P={1, 1, 0, 1, 1, 1, 1, 1, 1, 1}, Q=32.8324
P={0, 0, 1, 1, 1, 1, 1, 1, 1, 1}, Q=32.6969
P={1, 0, 1, 1, 1, 1, 1, 1, 1, 1}, Q=33.8324
P={0, 1, 1, 1, 1, 1, 1, 1, 1, 1}, Q=33.8324

In this case, the predetermined values A and the variation rates B of the necessary bit rates to be required for calculating the evaluation values Q are read out of the predetermined value table 51, and at the time T1, the allocation means 50 obtains the predetermined values A={3, 3, 4, 4, 4, 6, 6, 10, 10, 10} and the variation rates B={1, 1, 1, 1, 2, 1, 3, 2, 5, 3}.

From the calculation results of the above evaluation values Q, the allocation means 50 adopts the minimum evaluation value Q as the optimum combination as follows,

MP={1, 1, 1, 0, 0, 1, 0, 1, 0, 0}, MQ=19.8564 and outputs the corresponding relationship to the motion image encoder unit 12. That is, the allocation means 50 outputs the corresponding relationship instructing the motion image encoder unit 12 to multiplex the motion image signals V0 to V2, V5 and V7 to the first to fifth orders of the transponder C1 and to multiplex the motion image signals V3, V4, V6, V8 and V9 to the first to fifth orders of the transponder C0. The motion image encoder unit 12 thus conducts the aforementioned operation according to the corresponding relationship output from the allocation means 50.

Figure 8:
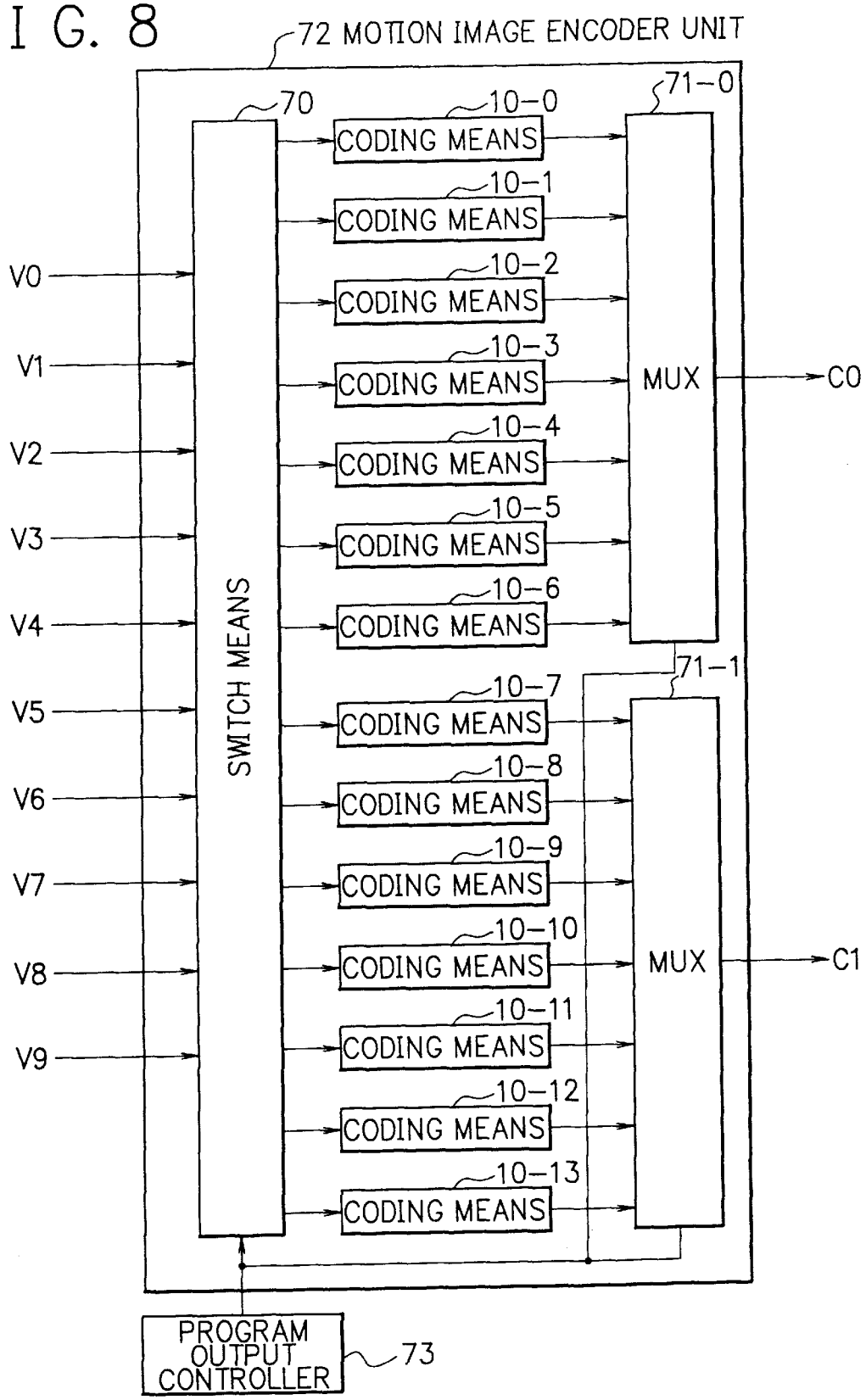
FIG. 8 is a block diagram of a motion image encoder according to a fourth embodiment of the present invention.

FIG. 8 shows a motion image encoder according to a fourth embodiment of the present invention. In this embodiment, the motion image encoder comprises a motion image encoder unit 72 and a program output controller 73.

The motion image encoder unit 72 includes a switch means 70, 14 coding means 10-0 to 10-13, and two multiplexers 71-0 and 71-1 which correspond to 7 coding means 10-0 to 10-6 and 7 coding means 10-7 to 10-13, respectively.

The program output controller 73 outputs a control signal representing the corresponding relationship between the motion image signals V0 to V9 and the transponders C0 and C1 so as to allocate the necessary bit rates of the motion image signals V0 to V9 to the transponders C0 and C1 equally. This corresponding relationship represented by the control signal shows which of the transponders C0 and C1 and which places of the transponder C0 or C1 the motion image signals are multiplexed to. Moreover, the corresponding relationship is changed with the elapse of time depending on the contents of the motion image signals V0 to V9.

The switch means 70 outputs the input 10 motion image signals V0 to V9 to 10 of the 14 coding means 10-0 to 10-13 according to the control signal sent from the program output controller 73 and outputs nothing to the other 4 coding means.

For instance, when the corresponding relationship represented by the control signal instructs that the motion image signals V0 to V4 are to be multiplexed to the first to fifth orders of the transponder C0 and the motion image signals V5 to V9 are to be multiplexed to the first to fifth orders of the transponder C1, the switch means 70 sends the motion image signals V0 to V4 to 5 of the 7 coding means 10-0 to 10-6 corresponding to the transponder C0 and the motion image signals V5 to V9 to 5 of the 7 coding means 10-7 to 10-13 corresponding to the transponder C1.

When inputting the motion image signal, each of the coding means 10-0 to 10-13 codes the motion image signal to output a code string, or, when inputting no motion image signal, each coding means does not output anything.

Each multiplexer 71-0 or 71-1 multiplexes at most the 7 code strings output from the 7 coding means 10-0 to 10-6 or 10-7 to 10-13 according to the corresponding relationship indicated by the control signal and outputs a multiplexed code string to the respective transponder C0 or C1. Moreover, the multiplexers 71-0 and 71-1 also multiplex the corresponding relationship represented by the control signal.

Figure 9:
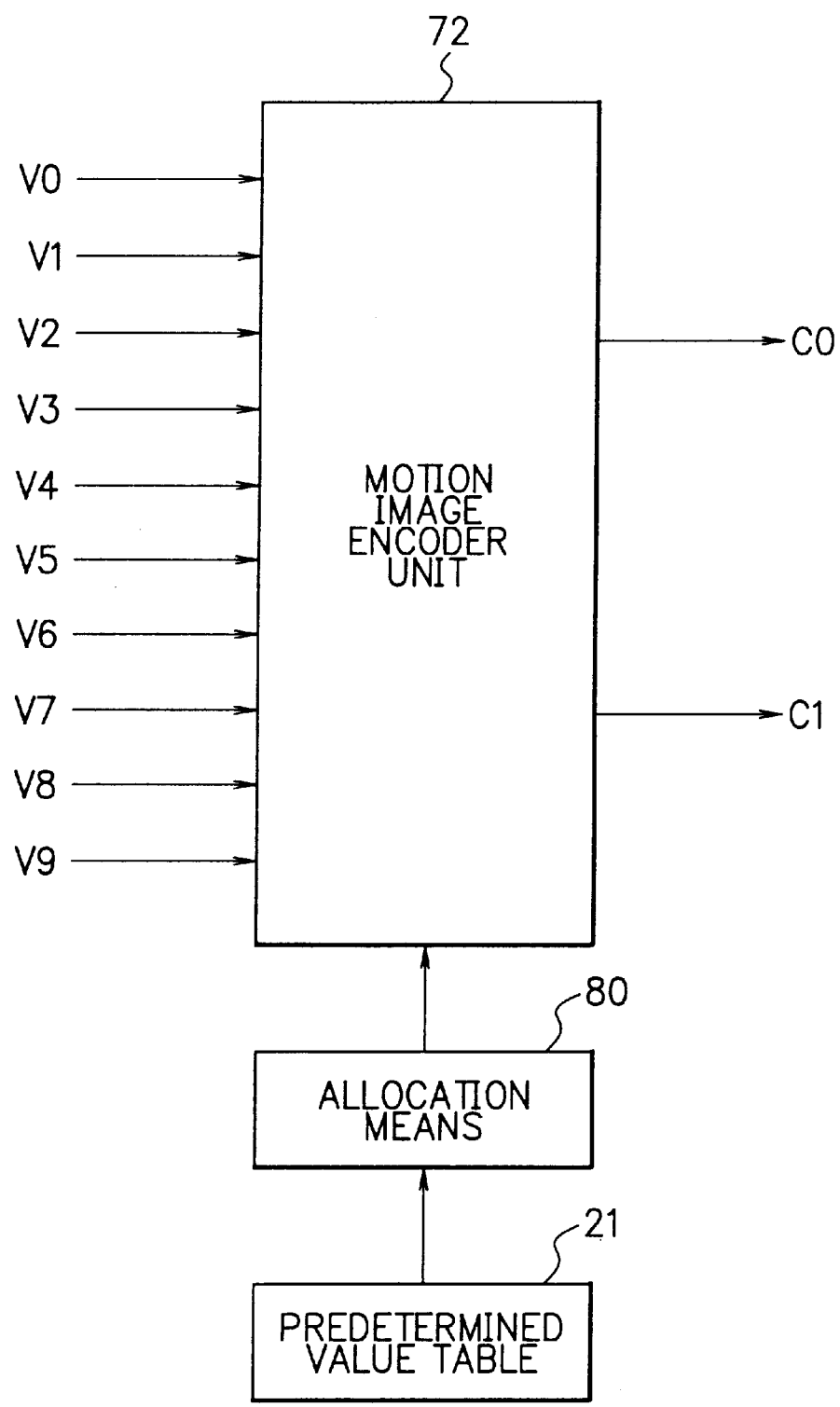
FIG. 9 is a block diagram of a motion image encoder according to a fifth embodiment of the present invention.

FIG. 9 shows a motion image encoder according to a fifth embodiment of the present invention. In this embodiment, the motion image encoder comprises a motion image encoder unit 72 having the same construction and functions as the fourth embodiment shown in FIG. 8, the allocation means 80 and a predetermined value table 21 having the same construction and functions as the second embodiment shown in FIG. 3.

The allocation means 80, similar to the allocation means 20 shown in FIG. 3, calculates the sum of the necessary bit rates of each transponder C0 or C1 with respect to the combination of at most 7 motion image signals allocated to one transponder according to the corresponding relationship of the 10 motion image signals V0 to V9 allocated to the two transponders C0 and C1 on the basis of the contents of the predetermined value table 21, adopts a combination of the motion image signals so as to permit the sum of the necessary bit rates to be closest to the transmission ability of each transponder to determine the corresponding relationship in each time period, and outputs the determined corresponding relationship to the motion image encoder unit 72. The motion image encoder unit 72 executes the operation in the same manner as described above according to the corresponding relationship received from the allocation means 80.

Figure 10:
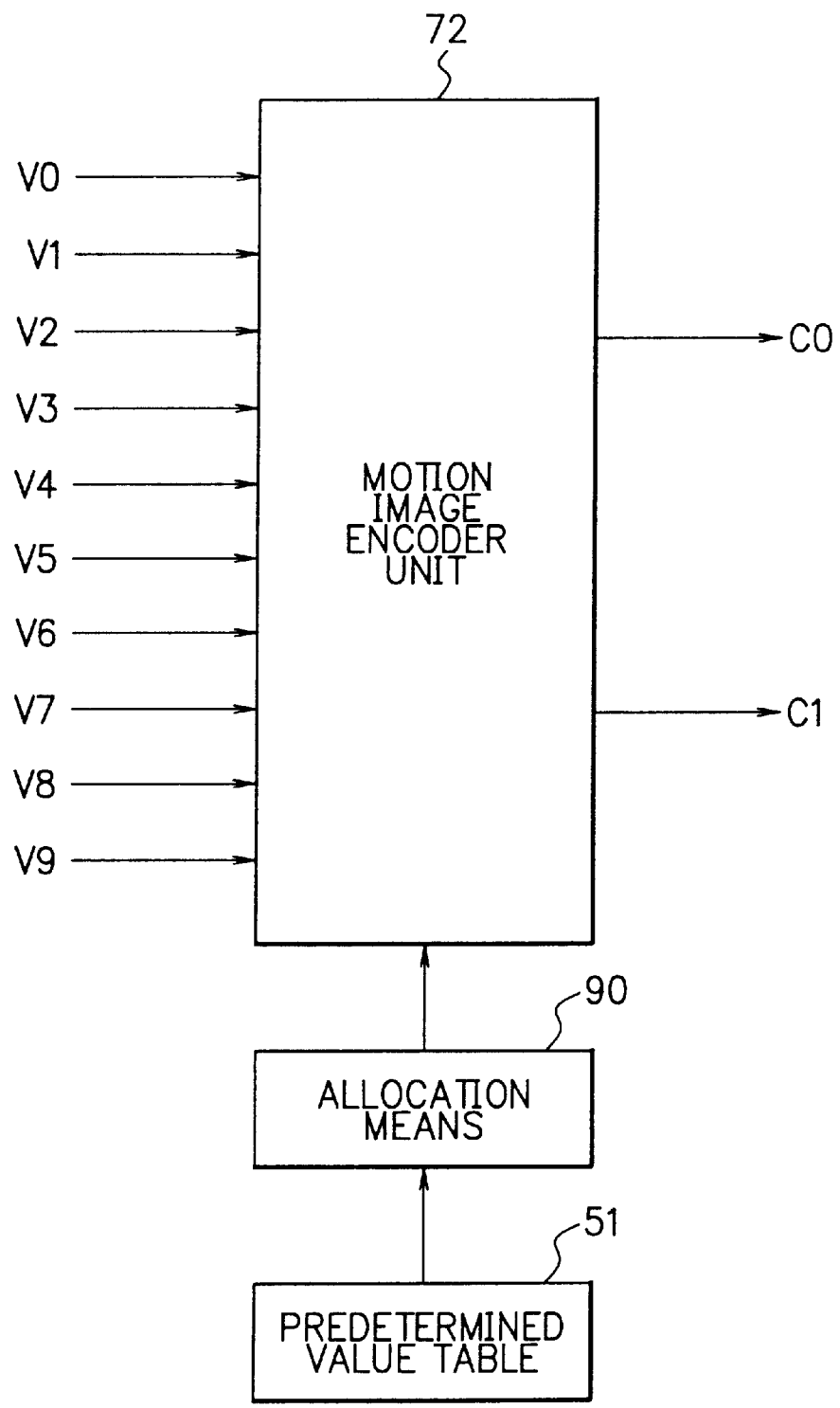
FIG. 10 is a block diagram of a motion image encoder according to a sixth embodiment of the present invention.

FIG. 10 shows a motion image encoder according to the sixth embodiment of the present invention. In this embodiment, the motion image encoder comprises a motion image encoder unit 72, an allocation means 90 and a predetermined value table 51 having the same construction and functions as the fourth embodiment shown in FIG. 6.

The allocation means 90, similar to the allocation means 50 shown in FIG. 6, calculates the statistical sum of the necessary bit rates of each transponder C0 or C1 with respect to the combination of at most 7 motion image signals allocated to one transponder according to the corresponding relationship of the 10 motion image signals V0 to V9 allocated to the two transponders C0 and C1 on the basis of the contents of the predetermined value table 51, adopts a combination of the motion image signals so as to minimize the maximum value of the sum of the necessary bit rates to determine the corresponding relationship in each time period, and outputs the determined corresponding relationship to the motion image encoder unit 72. The statistical sum of the necessary bit rates is calculated using formula (3) in the same manner described above.

Figure 11:
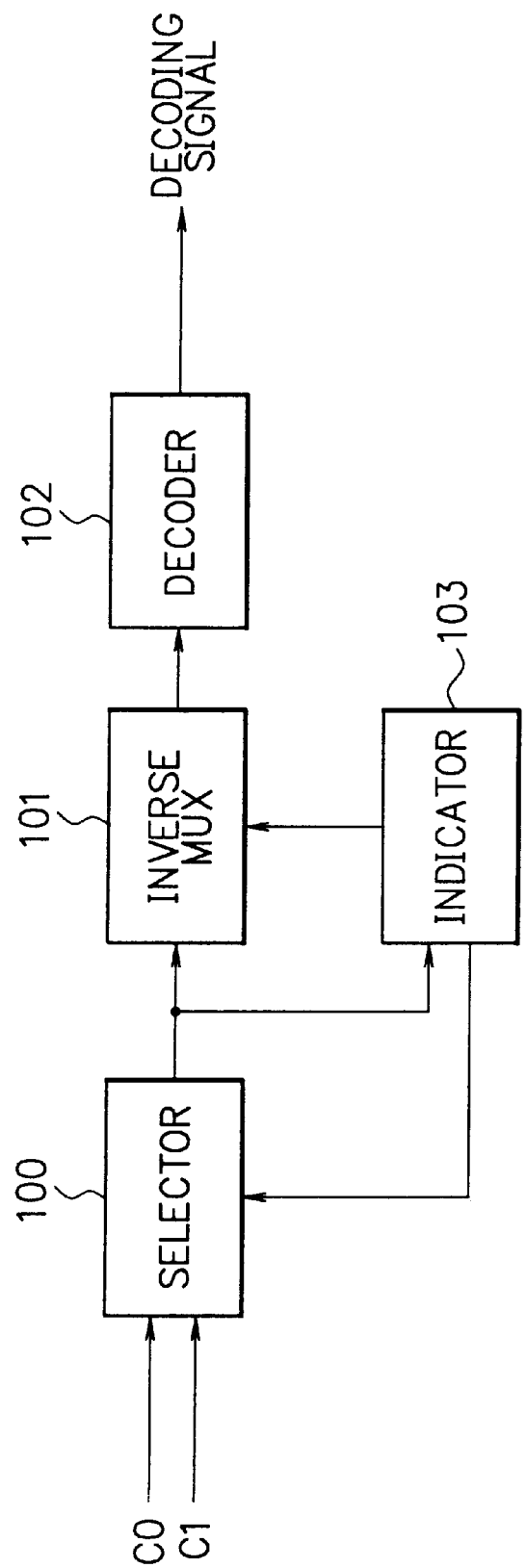
FIG. 11 is a block diagram of a motion image decoder according to a first embodiment of the present invention.

In FIG. 11, there is shown a motion image decoder according to a first embodiment of the present invention. The motion image decoder comprises a selector 100, an inverse multiplexer 101, a decoder 102 and an indicator 103.

A user inputs information showing a motion image signal to be decoded to the indicator 103. The indicator 103 picks out information of corresponding relationship from the input multiplexed code string, transfers information showing a transponder for transmitting the multiplexed code string including the motion image signal designated by the user, to the selector 100 and also transfers information showing which place of the transponder the motion image signal designated by the user is multiplexed to, to the inverse multiplexer 101. At this time, the information of the corresponding relationship is included in both multiplexed code strings sent from the transponders C0 and C1, and the indicator 103 can pick out the information of the corresponding relationship irrespective of which the selector 100 selects either transponder C0 or C1.

The selector 100 selects one of the multiplexed code strings sent via the transponders C0 and C1 according to the information transferred from the indicator 103 to output the selected multiplexed code string. The inverse multiplexer 101 picks out one code string from the multiplexed code string output from the selector 100 according to the information transferred from the indicator 103 to output the selected code string. The decoder 102 decodes the code string output from the inverse multiplexer 101 to output a motion image signal.

Figure 12:
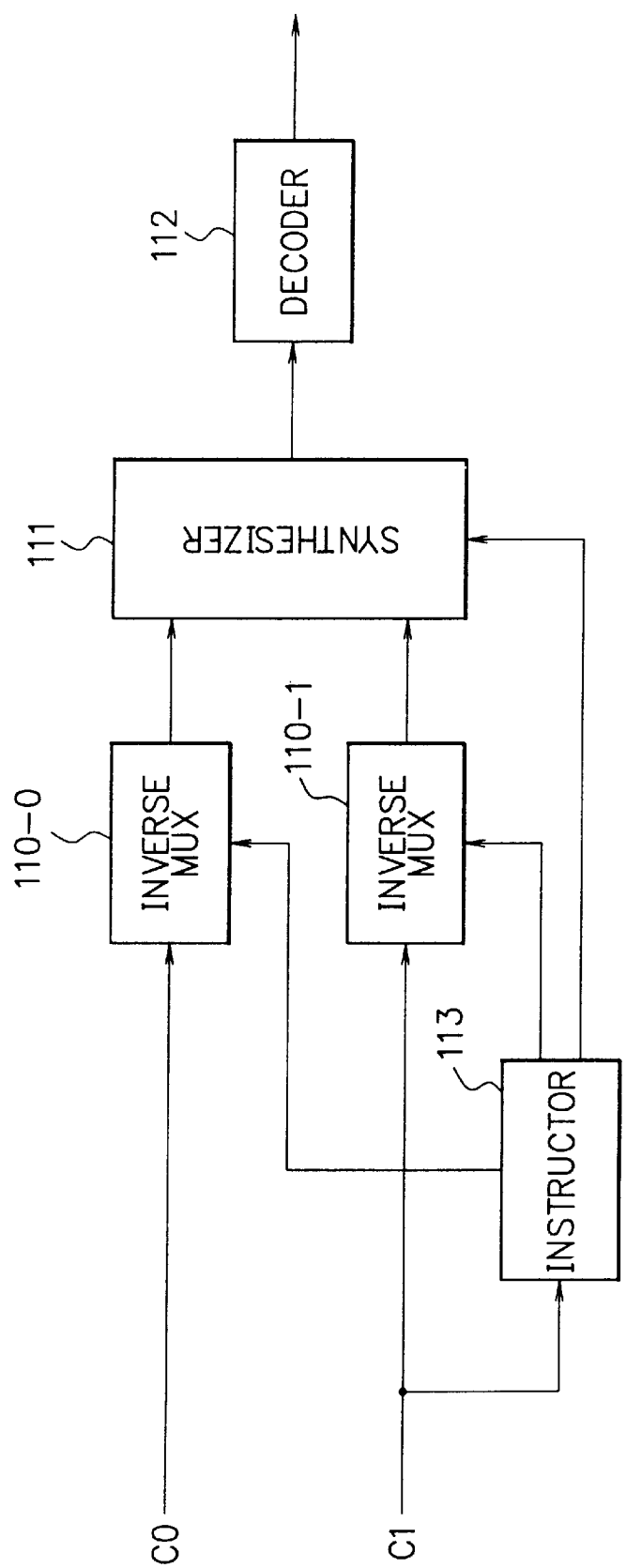
FIG. 12 is a block diagram of a motion image decoder according to a second embodiment of the present invention.

FIG. 12 shows a motion image decoder according to a second embodiment of the present invention. The motion image decoder comprises two inverse multiplexers 110-0 and 110-1, a synthesizer 111, a decoder 112 and an instructor 113.

A user inputs information showing a motion image signal to be decoded to the instructor 113. The instructor 113 picks out information of corresponding relationship from the input multiplexed code string, and also transfers information showing which place of the transponder the motion image signal designated by the user is multiplexed to, to one inverse multiplexer 110-0 or 110-1 including the motion image signal designated by the user. However, the instructor 113 does not send anything to the other inverse multiplexer 110-1 or 110-0.

The inverse multiplexer 110-0 or 110-1 having been transferred the information from the instructor 113 selects one code string shown by the received information and outputs the selected code string to the synthesizer 111. The synthesizer 111 synthesizes the code strings output from the inverse multiplexers 110-0 and 110-1 to output a synthesized code string to the encoder 112. The decoder 112 decodes the synthesized code string to output a motion image signal.

Figure 13:
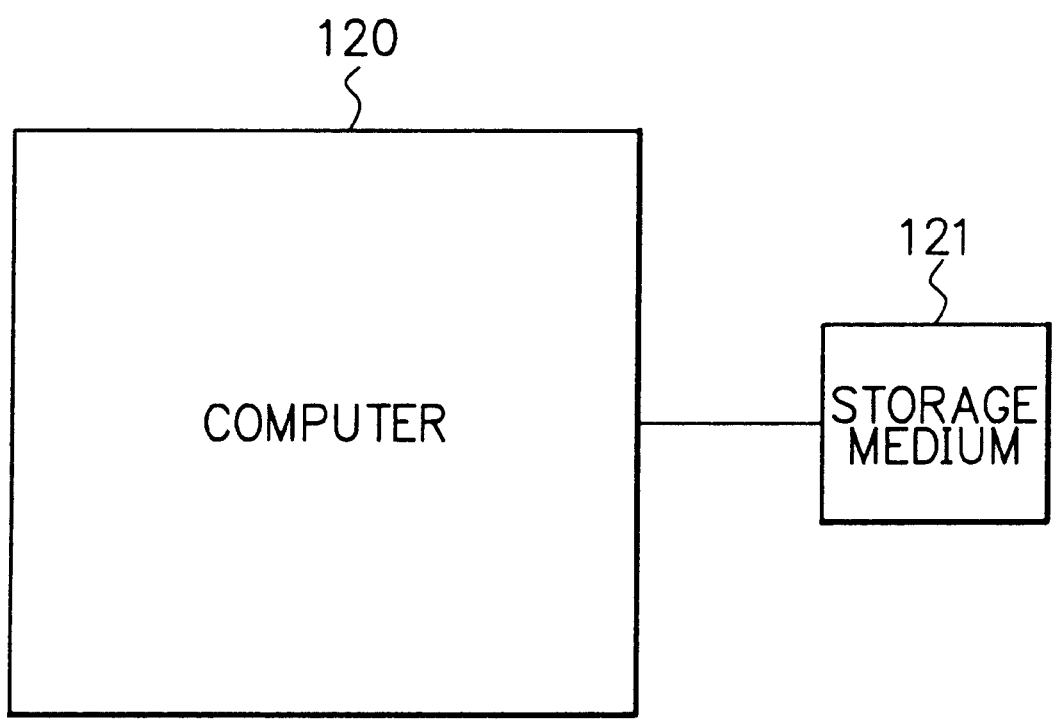
FIG. 13 is a block diagram showing a hardware construction of a motion image encoder and a motion image decoder according to one embodiment of the present invention.

FIG. 13 illustrates a hardware construction of the motion image encoder shown in FIG. 2 and the motion image decoder shown in FIG. 11. This hardware construction comprises a computer 120 and a storage medium 121. A semiconductor memory, a magnetic disk, and other suitable storage media can be used for the storage medium 121.

When the motion image encoder shown in FIG. 2 is realized, a motion image encoding program is stored in the storage medium 121. This motion image encoding program stored in the storage medium 121 is read into the computer 120, and the operation of the computer 120 is controlled to realize the coding means 10-0 to 10-9, the multiplexer 11 and the program output controller 13 shown in FIG. 2 on the computer 120.

Further, when the motion image decoder shown in FIG. 11 is realized, a motion image decoding program is stored in the storage medium 121. This motion image decoding program stored in the storage medium 121 is read into the computer 120, and the operation of the computer 120 is controlled to realize the selector 100, the inverse multiplexer 101, the decoder 102 and the indicator 103 shown in FIG. 11 on the computer 120.

As described above, in the motion image encoder according to the present invention, the relationship between the motion image signals and the transponders are not fixed, and the motion image signals are allocated to the transponders so that the bit rates of the multiplexed code strings output to each transponder may be closest to its transmission ability. Hence, a plurality of transponders can be utilized without overs and shorts, and as a result, image quality degradation can be prevented.

Further, in the motion image encoder of the present invention, including a predetermined value table for storing predetermined values of the necessary bit rates of N motion image signals in a certain time period, the corresponding relationship between transponders and the motion image signals allocated thereto in each time period is determined so that the sum of the necessary bit rates of the motion image signals allocated to each transponder may be closest to its transmission ability on the basis of the contents of the predetermined value table, resulting in preventing image quality degradation with a simple construction.

Further, in the motion image encoder of the present invention, including a predetermined value table for storing predetermined values and variation rates of the necessary bit rates of N motion image signals in a certain time period, the corresponding relationship between transponders and the motion image signals allocated thereto in each time period is determined so that the statistical sum of the necessary bit rates of the motion image signals allocated to each transponder may be closest to its transmission ability on the basis of the contents of the predetermined value table, resulting in preventing image quality degradation more effectively with a simple construction.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multiplex data transmission system for transmitting coded data signals over a plurality of channels comprising:

N data signal encoding devices;

a data input signal source connected to each of the N encoding devices;

the encoding devices each being operative to encode incoming data signals at a selected bit rate sufficiently high to avoid data loss upon subsequent decoding, and to generate a coded data signal;

M transmitting devices, M being greater than 1 but less than N, each transmitting device having a predetermined data transmission bit rate;

a multiplexing device having N inputs respectively receiving the coded data signal from one of the encoding devices, and M outputs respectively providing an input to one of the transmitting devices, the multiplexing device being operative to sample M distinct sub-groups of the N coded input signals, to generate a multiplexed output data string for each of the M sub-groups and to couple the M multiplexed data strings respectively as inputs to the M transmitting devices; and a controller for the multiplexing device, the controller being operative to allocate the N coded input signals to the M sub-groups such that the sum of the individual encoding bit rates for the coded data signals allocated to a sub-group is optimized relative to the data transmission bit rate for the associated transmitting device.

2. A multiplex transmission system as described in claim 1, in which the controller is operative to determine the sub-group allocation such that the sum of the encoding bit rates for coded signals comprising each sub-group is as close as possible to the data transmission bit rate for the corresponding transmitting device.

3. A multiplex transmission system as described in claim 1, further including:

a memory device that stores values of the encoding bit rates for each of the N coded data signals over a succession of time intervals, the controller being operative in response to the stored bit rate information to allocate the N coded input signals to the M sub-groups such that the sum of the encoding bit rates for coded signals comprising each sub-group is as close as possible to the data transmission bit rate for the corresponding transmitting device.

4. A multiplex transmission system as described in claim 3, in which:

the memory device further stores variation rate information for the respective encoding bit rates; and the controller is operative in response to the stored bit rate and variation rate information to allocate the N coded input signals to the M sub-groups such that the statistical sum of the encoding bit rates for coded signals comprising each sub-group is as close as possible to the data transmission bit rate for the corresponding transmitting device.

5. A multiplex data transmission system for transmitting a plurality of coded data signals comprising:

N data input signal sources;

M transmitting devices, M being greater than 1 but less than N, each transmitting device having a predetermined data transmission bit rate;

M separate multiplexing devices, each having a plurality of inputs and an output connected respectively as an input to one of the transmitting devices, and being operative to sample each of the inputs thereto, to generate a multiplexed output data string for each of the inputs and to couple the multiplexed output data string as an input to one of the transmitting devices;

a switching device, the switching device having N inputs respectively connected to one of the N data input signal sources;

a plurality of encoding devices, the encoding devices being divided into M distinct sub-groups, each encoding device being operative to encode an incoming data signal at a selected bit rate sufficiently high to avoid data loss upon subsequent decoding and to generate a coded data signal, the encoding devices in each sub-group being connected to supply inputs to a respective one of the M multiplexing devices, the switching device being operative to connect each of the N input signal sources respectively to a selected one of the encoding devices; and a controller that operates the switching device to select the encoding device sub-group to which each input signal source is connected such that the sum of the individual encoding bit rates for the coded data signals connected to each multiplexing device is optimized relative to the data transmission bit rate for the associated transmitting device.

6. A multiplex transmission system as described in claim 5, in which the controller is operative to determine the encoder sub-group allocation such that the sum of the encoding bit rates for coded signals connected to each multiplexing device is as close as possible to the data transmission bit rate for the associated transmitting device.

7. A multiplex transmission system as described in claim 5, further including:

a memory device that stores values of the encoding bit rates for each of the N coded data signals over a succession of time intervals, the controller being operative in response to the stored bit rate information stored to allocate the N data input signals to the M encoder sub-groups such that the sum of the encoding bit rates for coded signals connected to each multiplexing device is as close as possible to the data transmission bit rate for the associated transmitting device.

8. A multiplex transmission system as described in claim 7, in which:

the memory device further stores variation rate information for the respective encoding bit rates; and the controller is operative in response to the stored bit rate and variation rate information to allocate the N coded input signals to the M encoder sub-groups such that the statistical sum of the encoding bit rates for coded signals connected to each multiplexing device is as close as possible to the data transmission bit rate for the associated transmitting device.

9. A multiplex transmission system as described in claim 5, in which the total number of encoding devices is greater than or equal to N.

10. A method for multiplex transmission of N data signals over M channels, M being greater than 1 but less than N, each channel having a predetermined data transmission bit rate, the method comprising:

encoding each of the N data input signals at a bit rate sufficiently high to avoid data loss upon subsequent decoding;

generating a coded output signal;

grouping each of the N coded data signals into M distinct sub-groups;

generating a separate multiplexed coded data string from the coded data signals in each of the M sub-groups; and coupling each of the M multiplexed data strings respectively to one of the M channels, the allocation of the coded data signals into the M sub-groups being such that the sum of the individual encoding bit rates for the coded data signals transmitted over a particular channel is optimized relative to the data transmission bit rate for the associated channel.

11. A method as described in claim 10, in which the coded data signals are allocated to the M sub-groups such that the sum of the encoding bit rates for the coded data signals transmitted over a particular channel is as close as possible to the data transmission bit rate for the associated channel.

12. A method as described in claim 10, further including the step of:

storing values of the encoding bit rates for each of the N coded data signals over a succession of time intervals; and in which the N coded data signals are allocated to the M sub-groups with reference to the stored bit rate information.

13. A method as described in claim 12, further including the step of:

storing variation rate information for the respective encoding bit rates; and in which the N coded data signals are allocated to the M sub-groups with reference to the stored encoding bit rate values and the variation rate information such that the statistical sum of the encoding bit rates for the coded data signals transmitted over a particular channel is as close as possible to the data transmission bit rate for the associated channel.

14. A method as described in claim 10, in which the step of grouping the N coded data signals is comprised of the steps of:

selectively delivering each of the N data input signals to a separate encoding device, the encoding devices being divided into M distinct sub-groups, each sub-group being associated respectively with one of M multiplexing devices; and selecting the encoding device to which each input signal source is delivered such that the sum of the individual encoding bit rates for the coded data signals in each of the M sub-groups is optimized relative to the data transmission bit rate for the associated channel.

15. A method as described in claim 14, in which the coded data signals are allocated to the M sub-groups such that the sum of the encoding bit rates for the coded data signals transmitted over a particular channel is as close as possible to the data transmission bit rate for the associated channel.

16. A method as described in claim 14, further including the step of:

storing values of the encoding bit rates for each of the N coded data signals over a succession of time intervals; and in which the N coded data signals are allocated to the M sub-groups with reference to the stored bit rate information.

17. A method as described in claim 16, further including the step of:

storing variation rate information for the respective encoding bit rates; and in which the N coded data signals are allocated to the M sub-groups with reference to the stored encoding bit rate values and the variation rate information such that the statistical sum of the encoding bit rates for the coded data signals transmitted over a particular channel is as close as possible to the data transmission bit rate for the associated channel.

18. A decoder for selectively recovering one of N coded multiplexed data signals, the N signals being grouped in M distinct separately multiplexed coded data strings, M being greater than 1 but less than N, the decoder comprising:

an input device by which a user designates the coded data signal to be recovered;

a selecting device which selects the multiplexed code string including the signal designated by the user, the selecting device being operative in response to information identifying the coded signals grouped in each of the M multiplexed code strings;

an inverse multiplexing device which extracts the designated coded data signal from the selected one of the M multiplexed code strings; and a decoding circuit which decodes the encoded data signal extracted by the inverse multiplexing device to recreate the desired data signal.

19. A decoder as described in claim 18 in which:

the inverse multiplexing device comprises M separate demultiplexers, each operative to extract one code string from a multiplexed code string connected thereto; and the selecting device is operative to activate the demuliplexer associated with the one of the M incoming multiplexed signals to output the code string corresponding to the designated signal; and further including a synthesizing circuit which generates a synthesized code string from the outputs the demultiplexers, the decoding circuit being operative in response to the output of the synthesizing circuit.

20. A readable storage medium storing a program for a computer operated encoding system in which N coded data signals are grouped in M distinct sub-groups where M is greater than 1 but less than N, for multiplexed transmission over M separate transmission channels, each channel having a predetermined data transmission bit rate, the program operating the computer as:

N separate data signal encoders operative to encode incoming data signals at a selected bit rate sufficiently high to avoid data loss upon subsequent decoding, and to generate N respective coded data signals;

a multiplexer having N inputs, each input respectively receiving the coded data signal from one of the encoding devices, and providing M distinct outputs in the form of coded data strings; and a computation device which performs the functions of:
distinctly grouping the N coded data signals into the M sub-groups such that the sum of the individual encoding bit rates for the coded data signals allocated to a sub-group is optimized relative to the data transmission bit rate for the associated transmission channel; and
coupling the grouped coded data signals to the multiplexer;

the multiplexer being operative to convert the coded data signals in each sub-group to a separate multiplexed coded data string.

21. A storage medium as described in claim 10, in which the computation device further functions to determine the sub-group allocation such that the sum of the encoding bit rates for coded signals comprising each sub-group is as close as possible to the data transmission bit rate for the associated transmission channel.

22. A storage medium as described in claim 10, in which:

the computer further functions as a memory device that stores values of the encoding bit rates for each of the N coded data signals over a succession of time intervals; and the computation device is operative in response to the stored bit rate information to allocate the N coded input signals to the M sub-groups such that the sum of the encoding bit rates for coded signals comprising each sub-group is as close as possible to the data transmission bit rate for the associated transmission channel.

23. A storage medium as described in claim 22, in which:

the memory device further stores variation rate information for the respective encoding bit rates; and the controller is operative in response to the bit rate information and the variation rate information stored in the memory device to allocate the N coded input signals to the M sub-groups such that the statistical sum of the encoding bit rates for coded signals comprising each sub-group is as close as possible to the data transmission bit rate for the corresponding transmitting device.

24. A readable storage medium storing a program for a computer operated decoding system in which N coded data signals are grouped in M distinct sub-groups where M is greater than 1 but less than N, for multiplexed transmission over M separate transmission channels, each channel having a predetermined data transmission bit rate, the program operating the computer as:

an input device by which a user designates the coded data signal to be recovered;

a selecting device which selects the multiplexed code string which includes the signal designated by the user, the selecting device being operative in response to information identifying the coded signals grouped in each of the M multiplexed code strings;

an inverse multiplexing device which extracts the designated coded data signal from the selected one of the M multiplexed code strings; and a decoding circuit which decodes the encoded data signal extracted by the inverse multiplexing device to recreate the desired data signal.

25. A readable storage medium as described in claim 14 in which:

the inverse multiplexing device comprises M separate demultiplexers, each operative to extract one code string from a multiplexed code string connected thereto; and the selecting device is operative to activate the demuliplexer associated with the one of the M incoming multiplexed signals to output the code string corresponding to the designated signal; and further including a synthesizing circuit which generates a synthesized code string from the outputs the demultiplexers, the decoding circuit being operative in response to the output of the synthesizing circuit.

* * * * *